United States Patent [19]
Sery et al.

[11] 4,122,769
[45] Oct. 31, 1978

[54] CONTROL ARRANGEMENT FOR A BELT PRINTER

[75] Inventors: Jacques Sery, Vitry, Seine; Serge A. E. Couture, Le Plessis-Robinson, both of France

[73] Assignee: Compagnie Honeywell Bull (Societe Anonyme), Paris, France

[21] Appl. No.: 471,728

[22] Filed: May 20, 1974

[30] Foreign Application Priority Data

May 28, 1973 [FR] France ............................ 73 19329

[51] Int. Cl.² .......................... B41J 1/22; B41J 1/32
[52] U.S. Cl. ................................. 101/93.18; 400/70; 400/146
[58] Field of Search ................. 101/93.08, 93.18, 111, 101/16; 197/6.6, 49, 18, 55

[56] References Cited

U.S. PATENT DOCUMENTS

| | | | |
|---|---|---|---|
| 2,757,605 | 8/1956 | Dumey | 101/93.08 |
| 2,895,584 | 7/1959 | Hickerson et al. | 197/52 |
| 2,919,002 | 12/1959 | Palmer | 197/16 |
| 2,978,086 | 4/1961 | Hickerson | 197/16 |
| 3,227,258 | 1/1966 | Pannier et al. | 197/6.6 |
| 3,282,389 | 11/1966 | Rudisch et al. | 197/6.6 |
| 3,294,211 | 12/1966 | Mason | 197/48 |
| 3,399,753 | 9/1968 | Revelle | 197/49 |
| 3,516,528 | 6/1970 | Davidge et al. | 197/71 X |
| 3,586,953 | 6/1971 | Markkanen et al. | 318/685 |
| 3,707,214 | 12/1972 | Ponzano | 197/18 X |
| 3,828,669 | 8/1974 | Bonafino | 101/111 X |
| 3,837,457 | 9/1974 | Anbein et al. | 197/55 X |

*Primary Examiner*—Louis G. Mancene
*Assistant Examiner*—Paul J. Hirsch
*Attorney, Agent, or Firm*—Cameron, Kerkam, Sutton, Stowell & Stowell

[57] ABSTRACT

A control arrangement for a belt printer having characters arranged in successive series on an endless belt and passed continuously in front of a print support and hammers adapted to be actuated by a control device. A recording store is connected to a calculating unit and records information relating to each character to be printed along a line on the print support. A scan register contains information relating to the coincidences between the characters and the striking members at any given time. Information corresponding to the condition when a predetermined character is to be struck by a given hammer in the course of a given scan, is stored in a storage member along with information indicative of whether or not the predetermined character is repeated in the series of characters. A first comparator provides an output signal to the control device for actuation thereof when a comparison between the output of the scan register and one output of the storage member indicates an identity between information in the storage member. A second comparator provides an output for actuating the control device in response to a second comparison between an output from the first comparator and an output from a reference device containing for each of the various series of characters, information relating to the distance of the different points at which a repeated character is situated. The output of the second comparator is applied to the striker control through a dual input gate, the other input of which is taken from a second output of the storage member.

5 Claims, 2 Drawing Figures

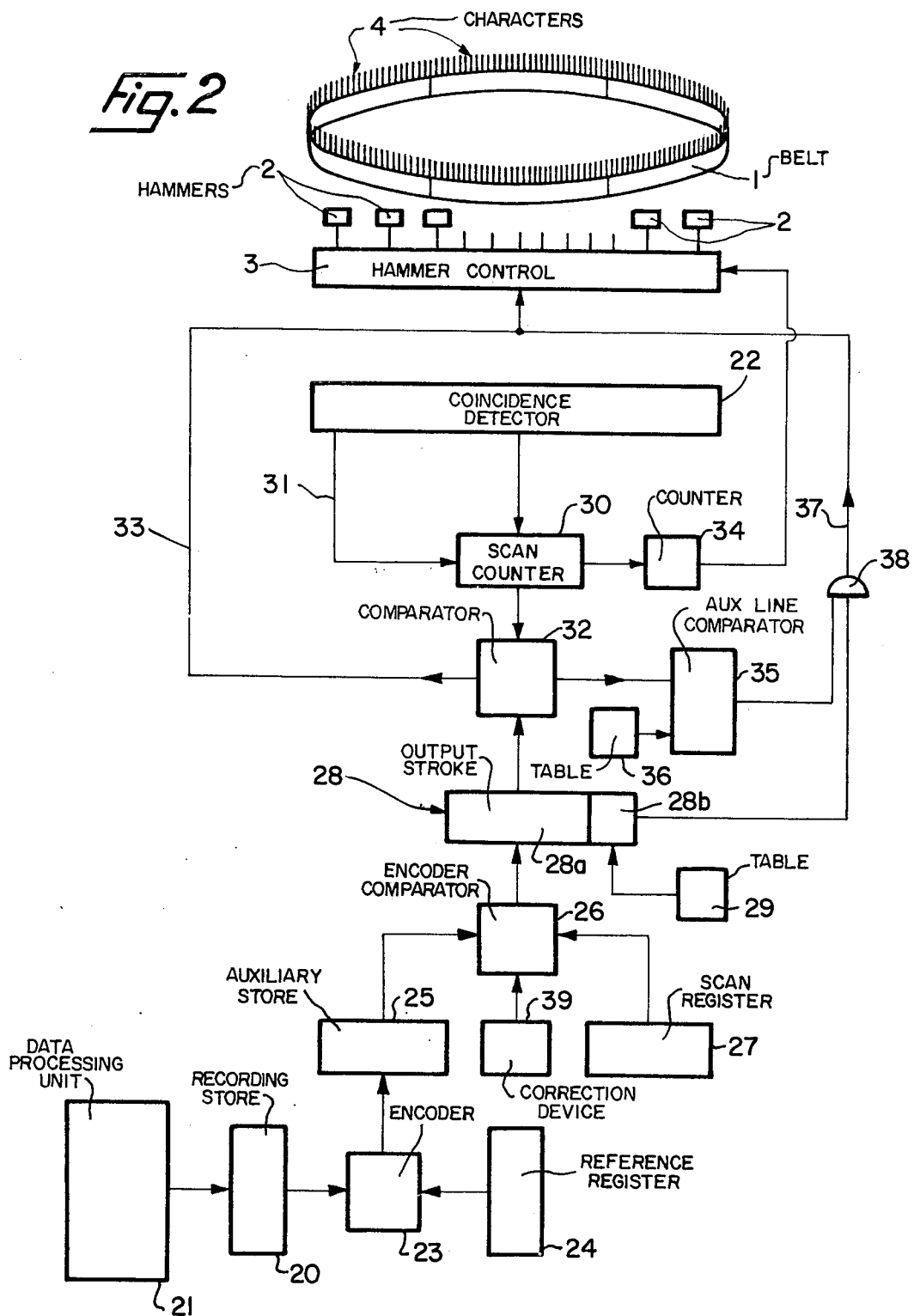

CONTROL ARRANGEMENT FOR A BELT PRINTER

The present invention relates to a control arrangement for a belt printer.

Printers are known in which endless belt bearing characters arranged in successive series passes continuously in front of a print support so that all the characters are brought into line with each possible print position along each line on the said print support. It will be understood that by "characters" are hereinafter meant letters, figures, symbols, full stops, dashes, etc. These characters are identified by a number which gives their ordinal position in the succession of characters carried by the belt, beginning from a reference character and they are distributed along the belt at a constant pitch.

Printing members are arranged opposite the belt and they are distributed at a constant pitch which is different from that of the characters. They are identified by an ordinal number and may be of the electromechanical type and may control strike hammers.

The arrangement for controlling such a printer incorporates a store for recording information relating to each character to be printed along a line, the said information establishing a relationship between each character and its ordinal number in the line to be printed. It also includes a detector member which on the one hand is able to detect coincidences between the positions of the striker members and the characters as the belt moves past and, on the other hand, is able to identify by means of number constant time periods known as scan and sub-scan periods. A scan is defined as the period between two moments at which a character coincides with a given striker member, while a sub-scan is the time which separates the successive groups of coincidences which occur during a scan.

In this known arrangement, a comparison system is connected to the outputs of the recording store and to the outputs of the member which detects coincidences, so that when during successive scans and sub-scans the output signals from the recording store and the output signals from the detector member are detected to be the same, this will cause the strike member appropriate to signals which appear at the outputs of the detector member to be operated by means for actuating them as a result of the signals in question appearing.

One of the drawbacks of known arrangements of this type is that they need a comparison system in which a storage member is connected to the read-out outputs of the recording store, via an encoder which is also connected to a store table which contains information relating to the position of each character on the belt. This table is necessarily of high capacity since it needs to contain as many locations as the belt has characters. Because of this, what is used for the table is part of the main store belonging to the data-processing system. The large amount of information concerning the position of characters on the belt thus causes the locations in the main store to be heavily occupied, particularly where certain frequently encountered characters are repeated in the said series, and it thus reduces the ability of the store in question to be used for calculating information.

The present invention substantially reduces or overcomes this drawback. It has as an object an arrangement for controlling a printer of the aforementioned type, in which certain frequently encountered characters are repeated in the series of characters on the belt.

In accordance with the invention, this control arrangement is rotatable in that it comprises, a storage member which supplies first information which indicates, on the basis of a table of character/striker coincidences, that a predetermined character in a line is to be struck by a given striker member in the course of a predetermined scan and second information item which states whether or not this character is repeated in the series of characters, a register which supplies information relating to the coincidences existing at any given time betwen characters and striker member, a two-output comparator which compares the first information form the said storage member and information transmitted by the said register, one of the outputs of the comparator controlling the striker member directly when comparison indicates that the said first information from the storage member and that from the said register are the same, while the other output of the comparator is connected to one of the inputs of a second comparator the other input of which receives, for each of the various series of character, information relating to the distance or distances between the different points at which a repeated character is situated, the output of this second comparator being capable of operating the said striker members via a gate which is governed by the second information from the storage member when the result of the comparison indicates that the sets of information received at the inputs of the said second comparator are the same.

Advantageously, all the series of characters are the same and when a character is repeated once in a series, its two ordinal numbers in the succession of characters are separated from one another by an amount equal to half the numbers of characters in the series in question.

The present invention is particularly advantageous when the number of bits provided for the first information from the storage member is in excess of the number of characters which can be printed. Thus, in present-day machines provision is made for the said information to cover eight bits, giving 256 possibilities. In actual fact, experience has shown that seven bits (128 possibilities) are adequate for many applications. This allows the eight bit to indicate whether the character is or is not repeated within a series (second information). However, if characters are repeated more than twice in a series it is, of course, necessary to use more than one bit to indicate the number of repetitions in question.

The invention will now be further described, by way of example, with reference to the accompanying drawings, in which:

FIG. 2 is a block diagram of one arrangement according to the invention.

Figure 1:
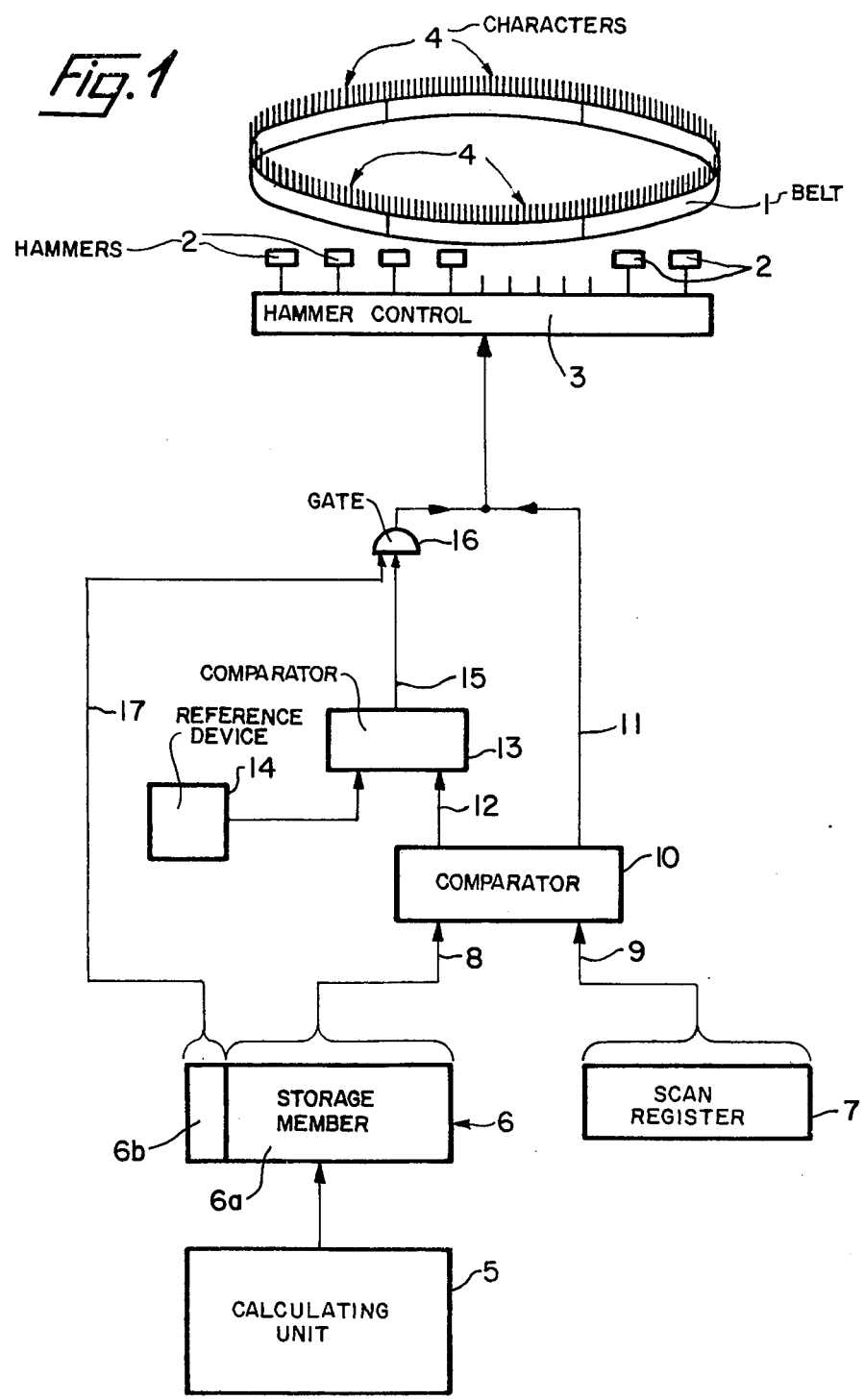
FIG. 1 is a schematic diagram illustrating an embodiment of the invention.

The machine according to the invention, which is shown schematically in FIG. 1, includes an endless belt 1 which forms a closed loop and which is driven by a drive device (not shown) in such a way that the characters which it bears pass in front of a row of hammers 2 which are capable of being actuated by a control device 3.

In a practical embodiment, the belt 1 has four hundred and eighty characters divided into six identical series 4 of 80 regularly spaced characters. The hammers 2 are 128 in number and they too are regularly spaced, though at a different pitch from the characters. The pitches selected for the characters and the hammers may, as an example, be such that at a given moment in time the characters in ordinal position 13k coincide with the hammers in ordinal position 16k (the value of k being a whole number 0, 1, 2 etc).

Within each series of characters 4, certain characters which are frequently to be struck are repeated once, that is to say the series contain these characters twice. Thus a character which is repeated in a series has two ordinal numbers along the belt. If the first ordinal number of a character in a series n and the character is repeated, its second ordinal number in the same series is n + (N/2), N being the number of characters in a series 4. In the example given above N/2=40.

When a line of characters is to be struck out by the device in FIG. 1, a calculating unit 5 supplies to a storage member 6 two sorts of information about the characters in this line. Initially, it supplies first information, which is then stored in part 6a of member 6, which indicates on the basis of a table of character/striker coincidences, that a specific character in the line is to be struck by a specific hammer in the course of a given scan. Subsequently, it supplies second information, which is then stored in part 6b of member 6, which indicates in the case of each character in the line whether it occurs only once in each series or is repeated.

In addition, a scan register 7 gives a continuous indication of the character/strike-hammer coincidences which occur as the belt passes in front of the hammer 2.

The output signals 8 and 9, from part 6a and register 7 respectively, are compared in a comparator 10. If they are the same, that is to say, if at the time in question a character to be struck, which is not repeated in the series, or alternatively the first position at which a repeated character to be struck is situated on the belt 1, is opposite the appropriate hammer 2, comparator 10 actuates, via its outputs 11, the device 3 which operates the appropriate hammer or hammers. If they are not the same, output 12 of the comparator 10 transmits the results of the comparison to the first input of a second comparator 13. The other input of this comparator 13 receives from a reference device 14 information on the number of character N/2 between the two positions at which a repeated character is to be found in a series.

If the result of the comparison carried out in comparator 13 confirms that the two sorts of information from comparator 10 and reference device 14 are the same, this means that at the time in question, a character coinciding with the appropriate hammer is situated in the given series at a distance N/2 from the character to be struck. Consequently, this character coinciding with the hammer may be either one which occurs once in the set and which is a distance of N/2 away from another character which only occurs once, or else may be the second occurrence of a repeated character. So that a strike will be made only in the second case, output 15 of comparator 13 is connected to the control device 3 which controls the hammers 2 via an AND gate 16 which only opens when it receives, via a line 17, the second information (which indicates whether or not the characters are repeated in a set of characters) from part 6b of the storage member 6.

FIG. 2 shows, in greater detail, an embodiment according to the invention of the control arrangement for a printer, this arrangement being one by which correspondence is established between the positions of the characters which are to be struck by printing members in predetermined positions and the numbers of the scans during which the characters in question are to be struck by these members are established.

In this arrangement are again shown the belt 1, the hammers 2, the control device 3 and the series of characters 4. It also includes a recording store 20, which records information relating to the characters to be struck along a line, which comes from a data-processing unit 21, and the ordinal numbers of the characters in question along the said line; these ordinal numbers corresponding to those of the hammers 2. In this way there are as many print positions along the line as there are hammers, i.e. 128 in the example chosen. For one character, the recording store contains binary information relating to the character itself and also information on the position at which it is to be struck.

Near the belt 1 and the hammer 2 is arranged a coincidence detector 22 which may be of the electromagnetic type and which gives a continuous indication of the coincidences which occur between the hammers 2 and the characters carried by the belt as the belt passes by. These coincidences occur in successive groups in the course of scan periods, which are identified by numbers and each represent the time interval between two successive moments at which a character coincides with a given hammer 2, two successive groups of such coincidences being separated by a time termed a sub-scan period.

An encoder 23 receives at one side, as viewed in the drawing, information from the recording store 20 and, at the other side, it receives information from a reference register 24. This reference register 24 may be of the read in/read out type and may be fed via a unit in the data-processing system. It may also be a read-only store. In either case, it contains binary information relating to the positions of the various characters in a series carried by the endless belt 1. An auxiliary store 25 which is connected to the output of encoder 23 allows information to be recorded relating to the ordinal numbers of the characters to be printed along a line and to the ordinal positions of these characters in a series of characters. This information is stored in the auxiliary store 25 in the same order as that in which the characters are to be printed along the line and is transmitted to the inputs of an encoder/comparator 26.

A scan register 27 contains information relating to coincidences between characters and strike hammers in the course of an initial scan and it is connected to another input of the encoder/comparator 26. The latter, since it knows the position of a character capable of being struck by a hammer in the course of the initial scan, enables the number of the scan during which a character may be struck by this hammer to be established. The encoder/comparator 26 then supplies to a part 28a of an output store 28 first information relating to the ordinal numbers of the characters to be printed and to the numbers of the scans in which these characters are to be struck. This first information is stored in the output store in the order in which the comparison was carried out, i.e. in the order of the sub-scans.

In addition, a table 29 supplies to part 28b of store 28 second information relating to the re-occurrence or otherwise of the characters to be struck.

A scan counter 30 is connected to the output of the member 22 for detecting character/hammer coincidences and each time the scan number changes it moves up by one unit. It is put into operation, for example, by electrical pulses received from member 22 via a link 31. For each current scan, counter 30 supplies to a comparator 32 information relating to the character/hammer coincidences. This comparator 32 also receives the first information from part 28a of store 28. Every time the information from counter 30 and that from store section 28a are the same, comparator 32 actuates the appropriate hammers via line 33 and the striker device 3. In each scan the characters are struck in the order of the sub-scans. To this end, the control device 3 is synchronized by a bi-directional counter 34, which is itself synchronized by counter 30.

When the information from counter 30 and that from store section 28a are not the same, comparator 32 transmits the result of the comparison to an auxiliary comparator 35 which compares the result in question with information (the number N/2 of character in a series) relating to the distances between the positions at which a repeated character is to be found, which comes from a table 36.

If the result of the comparison from comparator 32 corresponds to the information from table 36, the comparator transmits an operating order to the strike-controlling device 3 via line 37. However, so as to be sure that it really is a repeated character which is being struck, a gate 38 is positioned along line 37. This gate only opens if the second informations from store-section 28a allows it to.

Comparator 32 may be a simple subtractor. If the result of subtracting the information which it receives at its imputs is zero, it transmits a signal along line 33. If the result is positive, it is compared in the auxiliary comparator 35 with N/2 supplied by memory table 36.

In order to avoid the possibility of a negative result at the output of comparator 32, which would cause complications, the encoder/comparator 26 automatically supplies the lowest scan number for a given character. To this end, it may be monitored by a device 39 which carries out a modulo N/2 correction so that it is always this lowest scan number which is given.

It is thus apparent from the foregoing that the arrangement according to the invention enables a belt printer, whose sets of characters contain repeated characters, to be controlled without the necessity of forming the hardware counterpart of the whole succession of characters.

We claim:

1. In a control arrangement for a belt printer having characters arranged in successive series on the belt and passing continuously in the front of a print support and hammers arranged for controlled striking of these characters in response to actuation of a control device, the improvement comprising a recording store for recording information relating to each character to be printed along a line on the said support; a calculating unit having its input connected to the output of said recording store; a scan register containing information relating to the coincidences between the characters and the hammers at any given time; storage means connected to said calculating unit, said storage means being divided in two parts including a first part containing first information indicating that a predetermined character in a line is to be struck by a given hammer in the course of a given scan; and a second part containing second information indicative of whether or not this predetermined character is repeated in the series of characters; first comparator means for effecting a first comparison, said first comparator means having two inputs and two outputs, one input of said first comparator being connected to the output of the first part of the storage member, the other input of said comparator being connected to the output of the scan register, one output of said first comparator being connected to the control device for actuation thereof when the result of the first comparison indicates an identity between first information of storage member and information contained in the scan register; reference means containing for each of the various series of characters, information relating to the distance of the different points at which a repeated character is situated; means for effecting a second comparison, said second comparison means having two inputs and an output, one of said inputs of said second comparator means being connected to the other output of the first comparator, the other of said inputs of the second comparator being connected to the output of the reference device; and a gate connected at its input to the output of the second part of the storage member and to the output of the second comparator, the output of this gate being connected to the control device for actuation thereof when the result of the second comparison indicates an identity between information received at the inputs of the second comparator.

2. An arrangement according to claim 1 wherein all the series of characters are the same and when a character is repeated once in a series, its two ordinal numbers in the succession of characters are separated from one another by an amount equal to half the number of characters in a series.

3. An arrangement according to claim 2 wherein the storage member is organized so as to contain eight-bit information, seven bits being intended to convey the said first information while the eight bit is for the second information.

4. An arrangement according to claim 3, wherein the first comparator which effects the first comparison compares the first information with information from the scan register.

5. An arrangement according to claim 4 including means to ensure that the first information represents the lowest rank of scan in the cause of which a character must be struck.

* * * * *

UNITED STATES PATENT AND TRADEMARK OFFICE
CERTIFICATE OF CORRECTION

PATENT NO. : 4,122,769

DATED : October 31, 1978

INVENTOR(S) : Jacques SERY et al

It is certified that error appears in the above-identified patent and that said Letters Patent are hereby corrected as shown below:

Cover Page, headnote [30] following "Foreign Application Priority Data" after May delete "28" and substitute --23--; delete "73 19 329" and substitute --73 18 752--.

Signed and Sealed this

Twenty-third Day of March 1982

|SEAL|

Attest:

GERALD J. MOSSINGHOFF

Attesting Officer

Commissioner of Patents and Trademarks